United States Patent
Yoo (10) Patent No.: US 7,889,286 B2
(45) Date of Patent: Feb. 15, 2011

(54) BACKLIGHT UNIT AND LIQUID CRYSTAL DISPLAY MODULE INCLUDING THE SAME

(75) Inventor: Byung-Ik Yoo, Busan (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 12/289,660

(22) Filed: Oct. 31, 2008

(65) Prior Publication Data

US 2009/0115931 A1    May 7, 2009

(30) Foreign Application Priority Data

Nov. 6, 2007    (KR) .................... 10-2007-0112535

(51) Int. Cl.
  *G02F 1/1335*    (2006.01)
  *G02F 1/1333*    (2006.01)
  *G09F 13/04*    (2006.01)

(52) U.S. Cl. ...................... 349/58; 349/56; 362/97.1

(58) Field of Classification Search ............... 349/56, 349/58, 61, 158; 362/97.1, 97.2, 97.3
See application file for complete search history.

(56) References Cited

U.S. PATENT DOCUMENTS

| 7,751,015 | B2 * | 7/2010 | Murakami | .................. 349/150 |
| 2005/0105036 | A1 * | 5/2005 | Murakami | .................. 349/150 |
| 2009/0009682 | A1 * | 1/2009 | Chung et al. | .................. 349/58 |
| 2009/0115931 | A1 * | 5/2009 | Yoo | ........................... 349/58 |

* cited by examiner

*Primary Examiner*—Brian M Healy
(74) *Attorney, Agent, or Firm*—Morgan, Lewis & Bockius LLP (57) ABSTRACT

A backlight unit for a display device includes a frame having a bottom surface, a side wall and a groove, the groove disposed at a corner of the side wall; a lamp over the bottom surface and disposed along a first direction; a side support corresponding to at least one end of the lamp and disposed along a second direction being substantially perpendicular to the first direction; and a first fixing unit disposed at an end of the side support and including a first portion, the first portion extending from the side support along the second direction and corresponding to the groove.

20 Claims, 9 Drawing Sheets

FIG. 1

RELATED ART

*FIG. 2*

*RELATED ART*

BACKLIGHT UNIT AND LIQUID CRYSTAL DISPLAY MODULE INCLUDING THE SAME

The present invention claims the benefit of Korean Patent Application No. 10-2007-0112535 filed in Korea on Nov. 6, 2007, which is hereby incorporated by reference.

BACKGROUND OF THE INVENTION

1. Field of the Invention

The invention relates to a backlight unit and a liquid crystal display module (LCDM), and more particularly, to a backlight unit including a side support that is compactly combined with a bottom frame and an LCDM including the backlight unit.

2. Discussion of the Related Art

As the society has entered in earnest upon an information age, a field of display devices that represent all sorts of electrical signals as visual images has developed rapidly and many kinds of flat panel display devices (FPDs), such as liquid crystal display (LCD) devices, plasma display panels (PDPs), field emission display (FED) devices, electroluminescence display (ELD) devices, and so on, have been introduced. Since they have excellent capabilities of a thin profile, light weight and low power consumption, and so on, they are substituted for the cathode ray tube (CRT) rapidly and came into the spotlight.

Among these devices, LCD devices are widely used for notebook computers, monitors, TV, and so on, because of their high contrast ratio and characteristics adequate to display moving images. Generally, an additional light source is required because the LCD panel is a non-emissive-type display device. Accordingly, a backlight unit is disposed under the LCD panel. The LCD device displays images using light produced by the backlight unit and supplied to the LCD panel.

The backlight unit may be divided into an-edge type and a direct type depending on arrangement of light source. In the edge type backlight unit, one light source is positioned at a side of the backlight unit. Particularly, the light source is positioned at a side of a light guide plate of the backlight unit. Or, a pair of light sources is positioned at both side of the light guide plate. In the edge type backlight unit, there is an advantage of a simple fabricating process, while it is not available for a large size LCDM.

In the direct type backlight unit, at least one light source is positioned under an optical sheet. There is an advantage of application for a large size LCDM due to uniform light in the direct type backlight unit.

Figure 1:
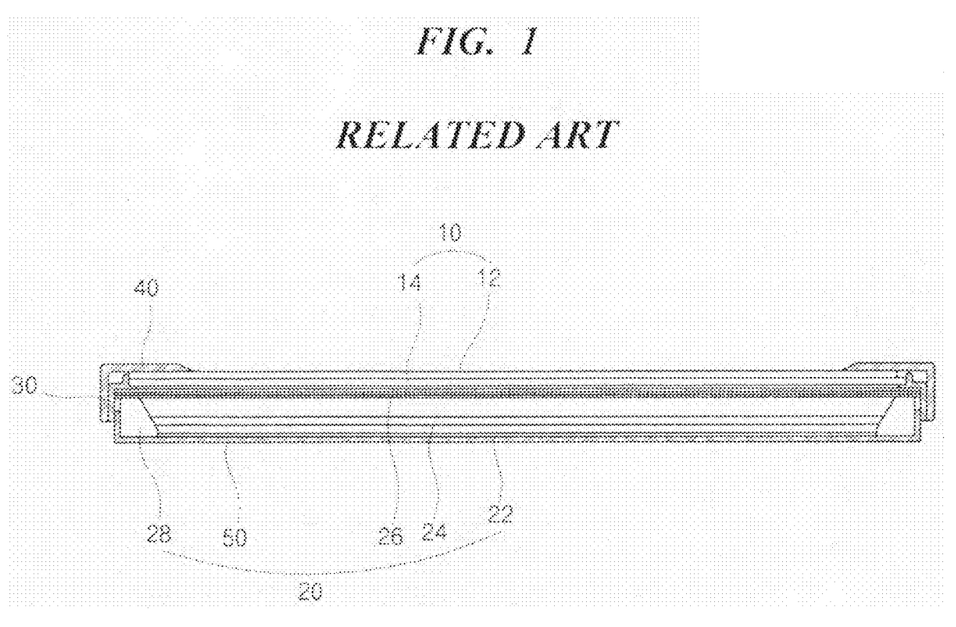
FIG. 1 is a cross-sectional view of a related art direct type liquid crystal display module (LCDM)

FIG. 1 is a cross-sectional view of a related art direct type liquid crystal display module (LCDM). Referring to FIG. 1, the LCDM includes a liquid crystal panel 10, a backlight unit 20, a main frame 30 and a top frame 40. The liquid crystal panel 10 includes first and second substrates 12 and 14 facing each other and a liquid crystal layer therebetween. The liquid crystal panel 10 is connected to gate and data printed circuit boards (PCBs) (not shown) through a flexible circuit board (not shown) that provide a scanning signal and an image signal to the liquid crystal panel 10, respectively.

The backlight unit 20 includes a bottom frame 50, a reflective sheet 22, a lamp 24, an optical sheet 26 and a side support 28. The reflective sheet 22 is disposed on the bottom frame 50, and the lamp 24 is arranged on the reflective sheet 22. The side support 28 is disposed at both ends of the lamp 24 to fix the lamp 24. The optical sheet 26 is disposed over the lamp 24 and the side support 26 and includes at least one diffusion plate (not shown) and a prism sheet (not shown).

The backlight unit 20 is disposed at a backside of the liquid crystal panel 10. The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

The side support 28 is combined with the bottom frame 50 using at least two fixing elements. It is explained with reference to FIG. 2.

Figure 2:
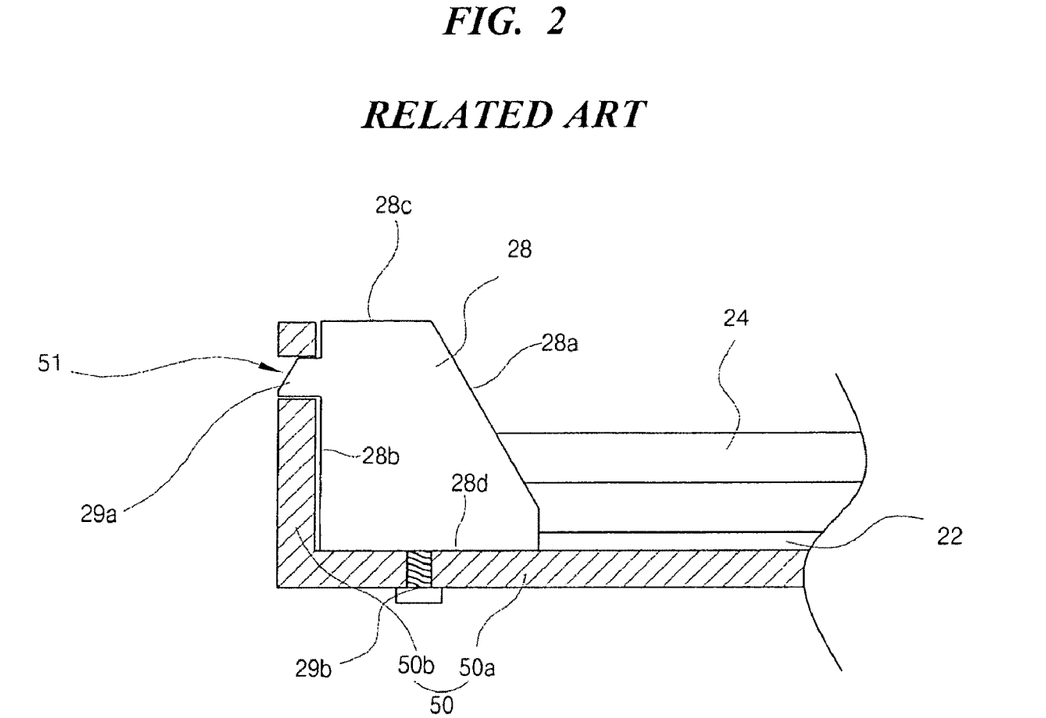
FIG. 2 is a cross-sectional view showing a combined structure of a side support and a bottom frame according to the related art.

FIG. 2 is a cross-sectional view showing a combined structure of a side support and a bottom frame according to the related art. Referring to FIG. 2, the side support 28 includes first to fourth side surfaces 28a, 28b, 28c and 28d and is disposed at a side of a reflective sheet 22. The first and second side surfaces 28a and 28b, and the third and fourth side surfaces 28c and 28d face each other, respectively. The first side surface 28a adjacent to a lamp 24 is oblique to the reflective sheet 22. The second side surface 28a is substantially perpendicular to the reflective sheet 22, and the third and fourth side surfaces 28c and 28d are substantially parallel to the reflective sheet 22. The side support 28 is combined with the bottom frame 50 and includes an opening (not shown) where an end of the lamp 24 is inserted.

In addition, the side support 28 includes a protrusion 29a protruding from the second side surface 28b and a first screw hole (not shown) at the fourth side surface 28d. The bottom frame 50 includes a bottom surface 50a, a first side wall 50b and second, third and fourth side walls (not shown). The first side wall 50b includes a hole 51. The hole 51 is at the first side wall 50a and corresponds to the hook 29a. By the protrusion 29a is inserted into the hole 51, the side support 28 is combined with the bottom frame 50. Moreover, the bottom frame 50 includes a second screw hole (not shown). The second screw hole (not shown) is disposed at the bottom surface 50a of the bottom frame 50 and corresponds to the first screw hole (not shown) of the side support 28. By inserting a screw 29b into the first and second screw holes (not shown), the side support 28 is further combined with the bottom frame 50.

However, there are some problems. Production costs and production time increase because of the screw 29b. Moreover, particles are generated when the screw 29b is inserted into the first and second-screw holes (not shown). There are damages on the side support 28 by stress from a process of inserting the screw 29b into the first and second screw holes (not shown). Moreover, particles are generated when the screw 29b is inserted into the first and second screw holes (not shown). The particles may degrade properties of a driving circuit (not shown). In addition, the particles affect the liquid crystal panel 10 (of FIG. 1) such that image qualities are degraded.

SUMMARY OF THE INVENTION

Accordingly, embodiments of the invention are directed to a backlight unit and an LCDM including the same that substantially obviate one or more of the problems due to limitations and disadvantages of the related art.

An object of the invention is to provide a backlight unit including a side support being compactly combined with a bottom frame and an LCDM including the backlight unit.

Another object of the invention is to reduce production costs in a backlight unit and an LCDM.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a backlight unit for a display device includes a frame having a bottom surface, a side wall and a groove, the groove disposed at a corner of the side wall; a lamp over the bottom surface and disposed along a first direction; a side support corresponding to at least one end of the lamp and disposed along a second direction being substantially perpendicular to the first direction; and a first fixing unit disposed at an end of the side support and including a first portion, the first portion extending from the side support along the second direction and corresponding to the groove.

In another aspect, a liquid crystal display module includes a liquid crystal panel; a backlight unit for projecting light on the liquid crystal panel, the backlight unit including: a first frame having a bottom surface, a side wall and a groove, the groove disposed at a corner of the side wall; a lamp over the bottom surface and disposed along a first direction; a side support corresponding to at least one end of the lamp and disposed along a second direction being substantially perpendicular to the first direction; and a first fixing unit disposed at an end of the side support and including a first portion, the first portion extending from the side support along the second direction and corresponding to the groove.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 3:
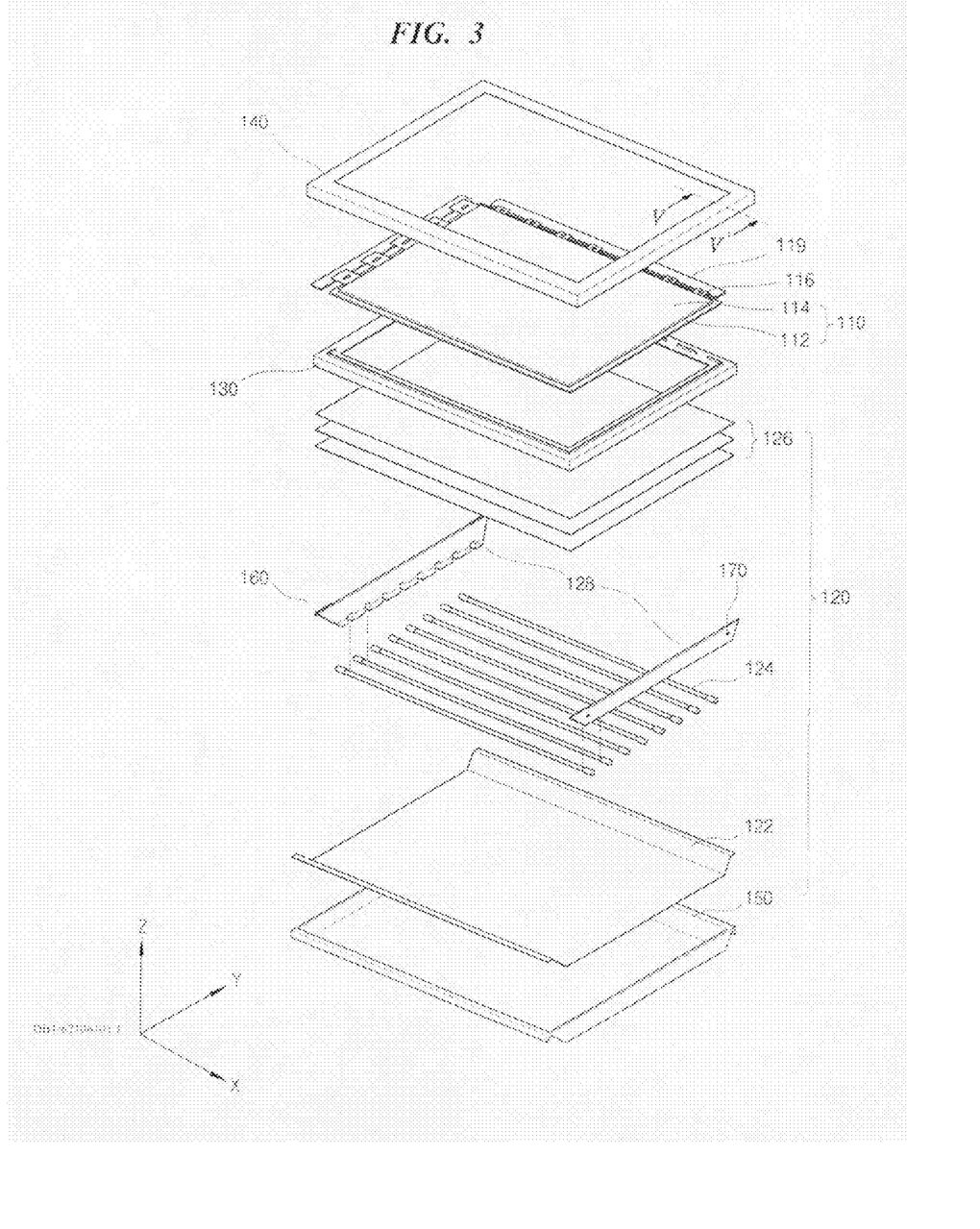
FIG. 3 is an exploded perspective view of a liquid crystal display panel (LCDM) according to the present invention.

FIG. 3 is an exploded perspective view of a liquid crystal display panel (LCDM) according to the present invention.

Referring to FIG. 3, the LCDM includes a liquid crystal panel 110, a backlight unit 120, a main frame 130 and a top frame 130. The liquid crystal panel 110 includes first and second substrates 112 and 114 facing each other and a liquid crystal layer (not shown) therebetween. When the liquid crystal panel 110 is driven in an active matrix type, a gate line (not shown) and a data line (not shown), which cross each other to define a pixel region (not shown), are formed on the first substrate 112. The first substrate 112 may be referred to as an array substrate. A thin film transistor (TFT) (not shown) is disposed at a crossing portion of the gate and data lines (not shown). A pixel electrode (not shown) in each pixel region (not shown) is connected to the TFT (not shown).

A black matrix (not shown) having a lattice shape is formed on the second substrate 114. The black matrix (not shown) corresponds to a non-display region, such as the gate line (not shown), the data line (not shown) and the TFT (not shown). A color filter layer (not shown), which includes red, green and blue sub-color filters and corresponds to each pixel region (not shown), is formed on the second substrate 114. Moreover, a common electrode (not shown) is formed on the black matrix (not shown) and the color filter layer (not shown). The second substrate 114 may be referred to as a color filter substrate.

The liquid crystal panel 110 is connected to gate and data printed circuit boards (PCBs) 119 through a flexible circuit board 116 that provide a scanning signal and an image signal to the liquid crystal panel 110, respectively. The printed circuit board 119 extends along end portions of a bottom frame 150 of the backlight unit 120, respectively, as dummy spaces. In FIG. 3, there are two printed circuit boards 119 at two adjacent sides of the liquid crystal panel 110. One includes a gate driving circuit applying a scanning signal, which controls ON/OFF in the TFT (not shown), to the gate line (not shown), and the other includes a data driving circuit (not shown) applying a image signal to the data line (not shown).

When the TFT (not shown) has an ON state by the scanning signal, the image signal is applied to the pixel electrode through the data line to produce an electric field between the pixel electrode (not shown) and the common electrode (not shown). As a result, as the intensity or direction of the electric field is changed, the alignment of the liquid crystal molecules (not shown) in the liquid crystal layer (not shown) also changes such that light transmissivity is controlled.

Although not shown, first and second alignment layers are formed on the first and second substrates 112 and 114, respectively, to determine an initial arrangement of the liquid crystal molecules. A seal pattern is formed along edges of the first and second substrates 112 and 114 to prevent leakage of the liquid crystal molecules. In addition, a polarizer is formed on an outer side of at least one of the first and second substrates 112 and 114.

The backlight unit 120 as a light source is disposed at a backside of the liquid crystal panel 110. The backlight unit 120 includes a bottom frame 150, a reflective sheet 122, a lamp 124, a side support 128 and an optical sheet 126. The bottom frame 150 covers back edges of the main frame 130, so the bottom frame 150 is combined with the main frame 130 and the top frame 140 for modulation. The reflective sheet 122 is disposed on a bottom surface of the bottom frame 150, and the lamp 124 is disposed on the reflective sheet 122. The side support 128 corresponds to both edges of the lamp 124 to fix the lamp 124. The optical sheet 126 is disposed over the lamp 124 and the side support 128.

Although not shown, the backlight unit 120 may include a lamp guide. The lamp guide holes the lamp 124 supports the optical sheet 126 such that the optical sheet 126 has a uniform distance with the lamp 124. The lamp guide prevents the lamp 124 being swayed. Moreover, damages on the lamp 124 from outer impacts are prevented. The lamp 124 includes one of a cold cathode fluorescent lamp (CCFL), an external electrode fluorescent lamp (EEFL) and a light emitting diode (LED) as a light source. When the lamp 124 includes the LED, the lamp guide may be omitted. Since light emitted from the lamp 124 is reflected on the reflective sheet 122, the LCDM has an improved brightness. The optical sheet 126 includes at least one diffusion plate (not shown) and at least one prism sheet (not shown) as a light-condensing sheet. By the light passing through the plurality of optical sheets 126, it has a uniform brightness.

The liquid crystal display panel 110 and the backlight unit 120 are combined using the main frame 130 and the top frame 140 that can prevent movement of the liquid crystal panel 110 and the backlight unit 120. The top frame 140 cover edges of the liquid crystal panel 110 and sides of the main frame 130, so the top frame 140 can support and protect of the edges of the liquid crystal panel 110 and sides of the main frame 130. As mentioned above, the bottom frame 150 having a bottom surface frame and four side surfaces covers back edges of the main frame 130, so the bottom frame 150 is combined with the main frame 130 and the top frame 140 for modulation. Moreover, images from the liquid crystal panel 110 can be displayed through an opening of the top frame 140.

On the other hand, the side support 128 is combined with the bottom frame 150 using first and second fixing-units 160 and 170. Movement of the side support 128 along an X direction and a Y direction is prevented due to the first fixing unit 160, and movement of the side support 128 along a Z direction is prevented due to the second fixing unit 170. It is explained with reference to FIGS. 4, 5, 6, 7A, 7B and 8.

Figure 4:
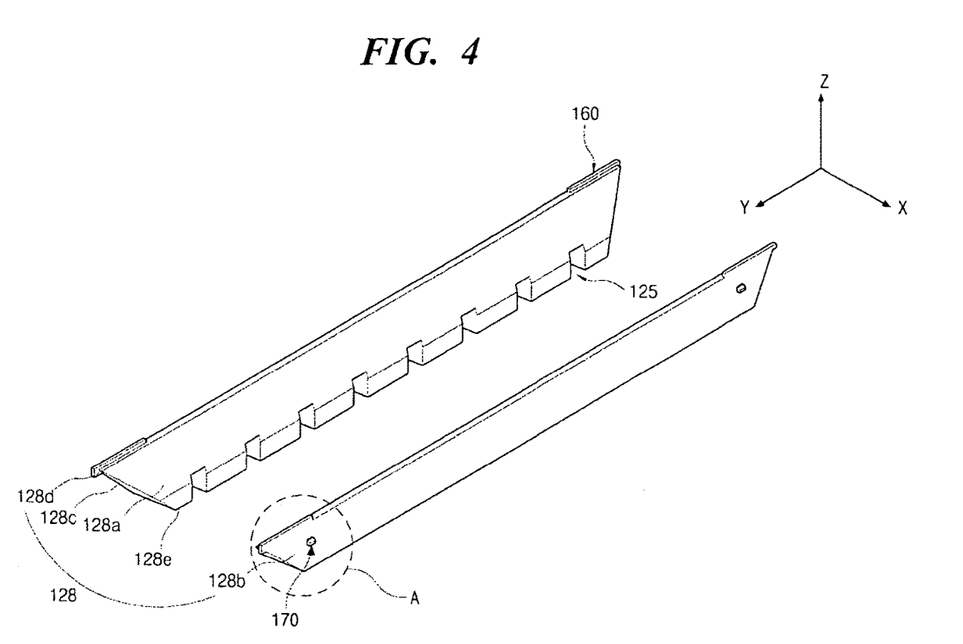
FIG. 4 is a perspective view of a side support of a backlight unit according to the present invention.
Figure 5:
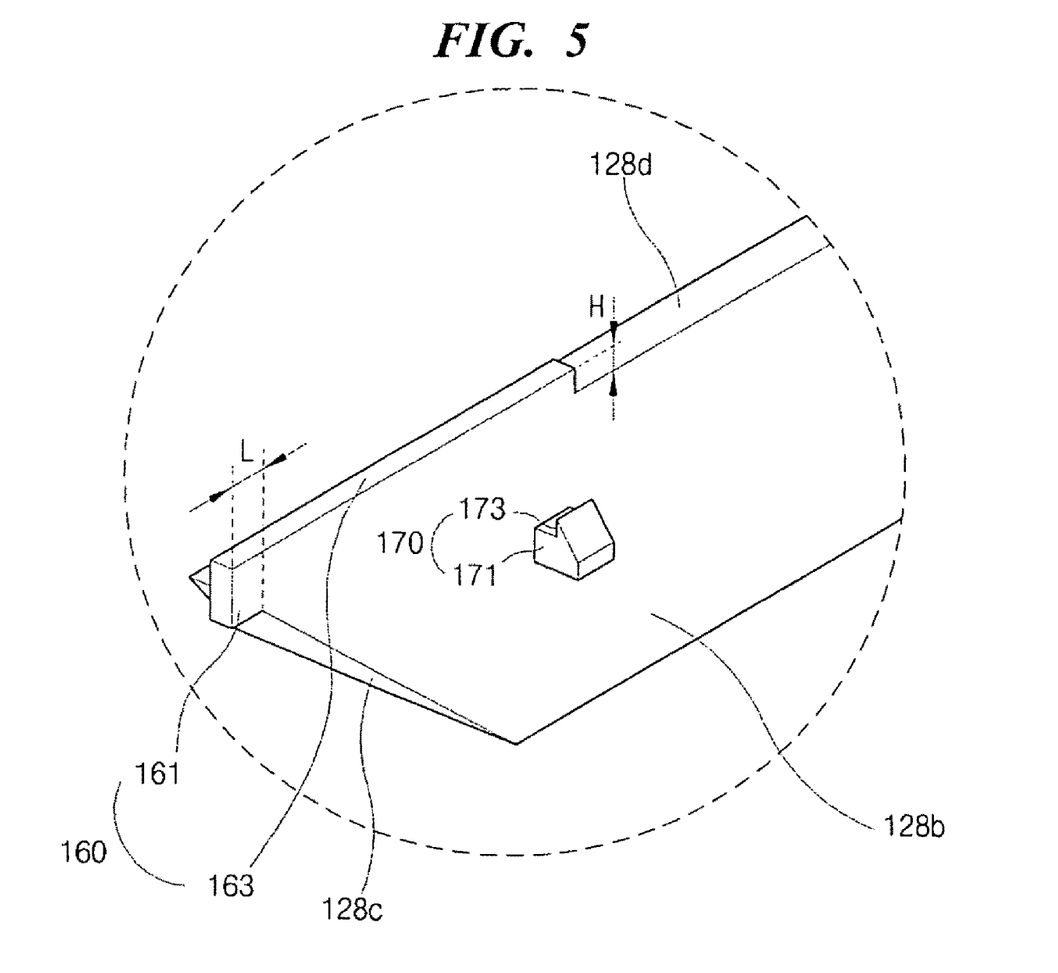
FIG. 5 is an enlarged view of an "A" portion in FIG. 4.
Figure 6:
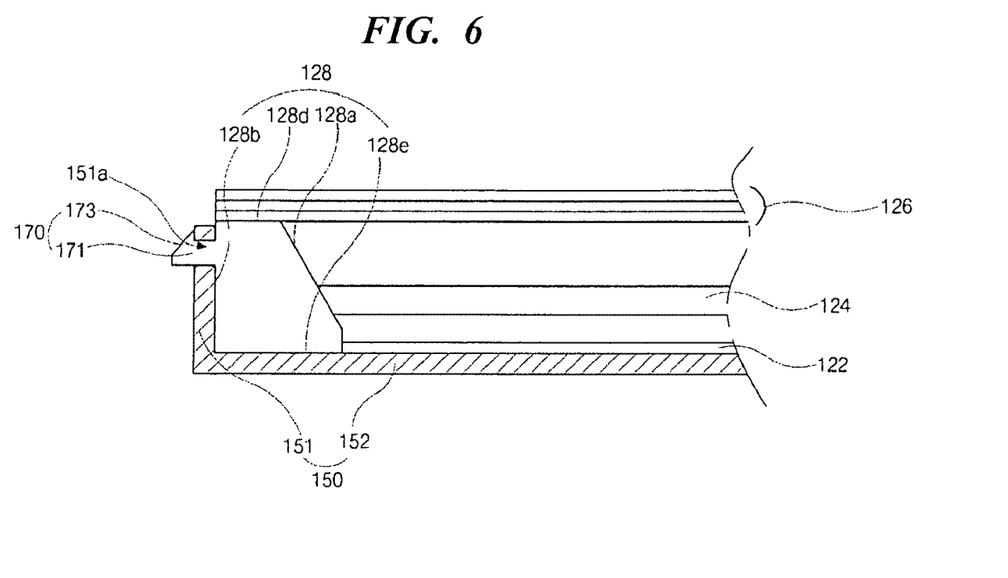
FIG. 6 is a cross-sectional view of a portion taken along the line VI-VI' in FIG. 5.
Figure 7A:
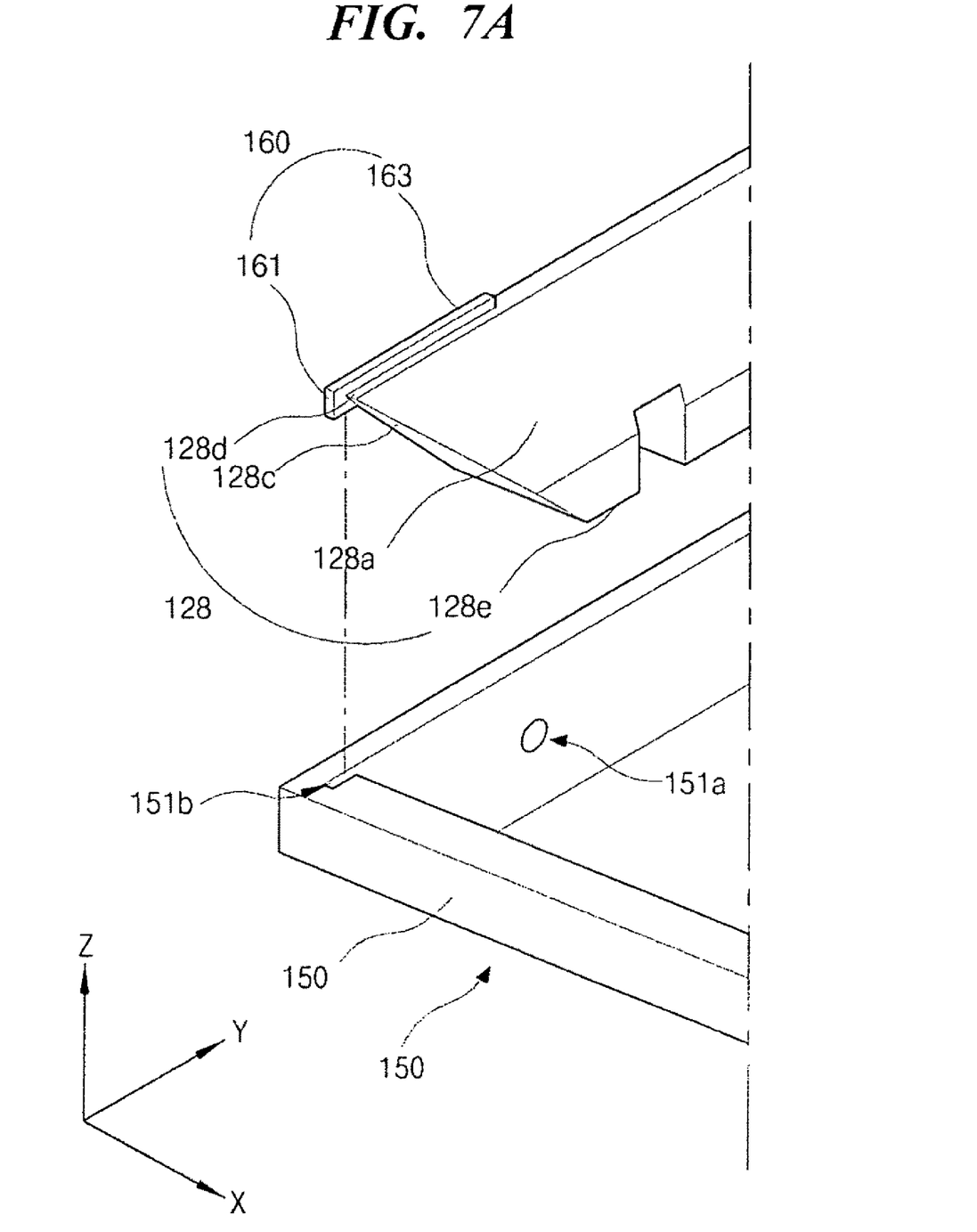
FIGS. 7A and 7B are perspective views showing a process of combining a fixing bar of a side support with a fixing hole of a bottom frame according to the present invention.
Figure 7B:
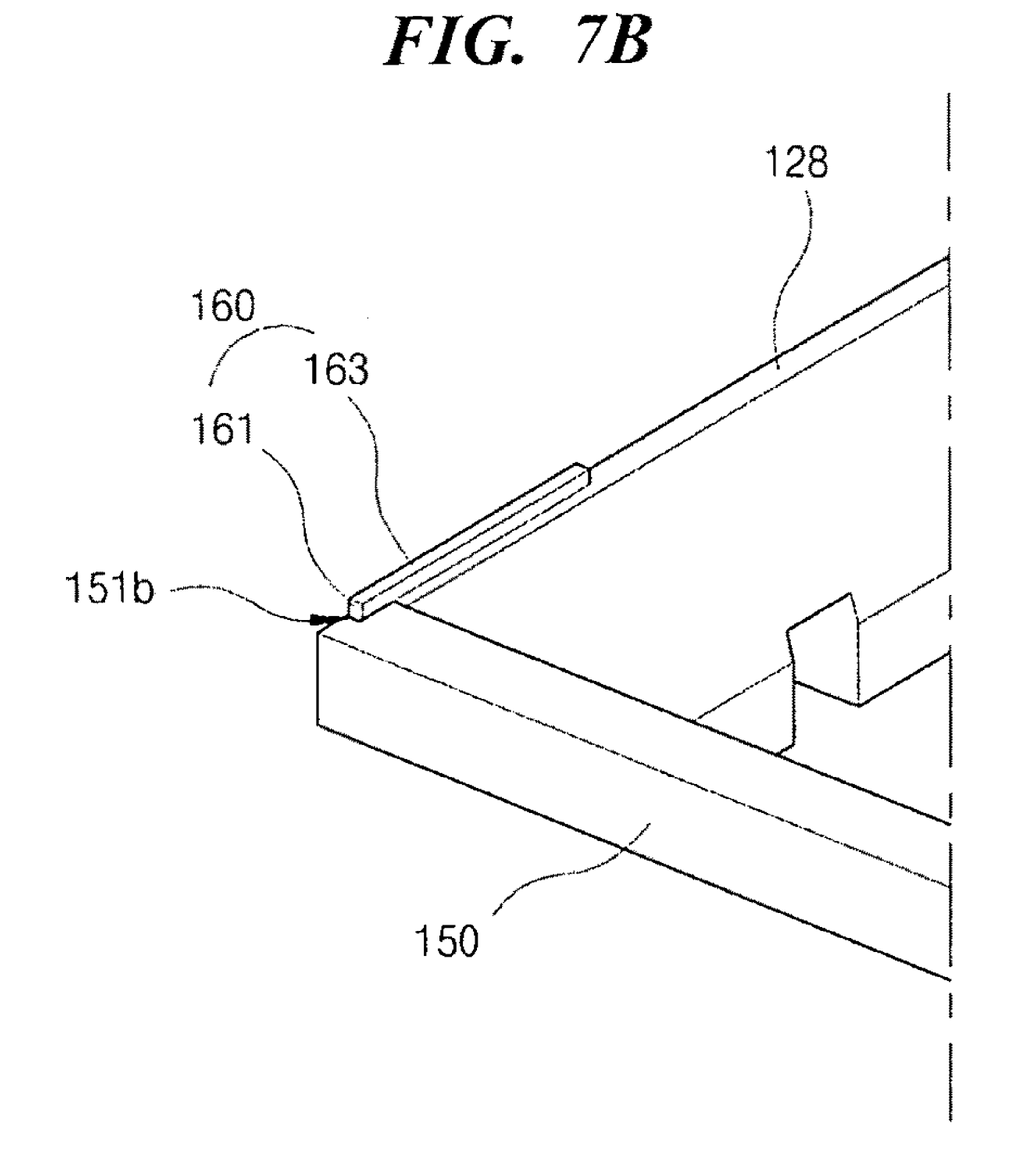

FIG. 4 is a perspective view of a side support of a backlight unit according to the present invention, and FIG. 5 is an enlarged view of an "A" portion in FIG. 4. FIG. 6 is a cross-sectional view of a portion taken along the line VI-VI' in FIG. 5, and FIGS. 7A and 7B are perspective views showing a process of combining a fixing bar of a side support with a fixing hole of a bottom frame according to the present invention.

Referring to FIG. 4, the side support 128 includes first to fifth surfaces 128a, 128b, 128c, 128d and 128e. The first surface 128a as a first side surface faces the second surface 128b as a second side surface. The fourth side surface 128d as a top surface faces the fifth surface 128e as a bottom surface. The third surface 128c as a third side surface corresponds to a space by the first, second, fourth and fifth surfaces 128a, 128b, 128d and 128e. The first surface 128a is oblique to the fifth surface 128e, and the second surface 128b is perpendicular to the fifth surface 128e. The fifth surface 128e is substantially parallel to and has a width greater than the fourth surface 128d. Namely, the first, second, fourth and fifth surfaces 128a, 128b, 128d and 128e form a trapezoid shape in a cross-sectional view. Since the fourth surface 128d as an upper side of the trapezoid shape has a smaller width than the fifth surface 128e as a lower side of the trapezoid shape, the LCDM has a boarder display region. The first surface 128a includes an opening 125 corresponding to the lamp 124 (of FIG. 3). Each end of the lamp 124 (of FIG. 3) is inserted into the opening 125 of the first surface 128a. The optical sheet 126 (of FIG. 3) is disposed on the fourth surface 128d. The side support 128 covers an electrode of the lamp 124 (of FIG. 3), which is a non-emitting portion, and provide a boarder display region. A bezel covering the top frame 140 (of FIG. 3) has a narrow width due to the above side support 128. It may be referred to as a narrow bezel. As mentioned above, the side support 128 is combined with the bottom frame 150 (of FIG. 3) using at least two fixing units.

Referring to FIG. 5, the side support 128 includes the first and second fixing units 160 and 170 at both ends. The first fixing unit 160 includes a first portion 161 protruding from the fourth surface 128d of the side support 128 along the Y direction and a second portion 163 protruding from the fourth surface 128d of the side support 128 along the Z direction. In other words, the first and second portions 161 and 163 of the first fixing unit 160 extend from the second surface 128b along the Y direction and the Z direction, respectively. The first portion 161 of the first fixing unit 160 protrudes by a length L, and the second portion 163 of the first fixing unit 160 protrudes by a height H. The second portion 163 may be omitted.

The second fixing unit 170 includes a first portion 171 protruding from the second surface 128b of the side support 128 along the X direction and a second portion 173 protruding from the first portion 171 of the second fixing unit 170 along the Z direction. The second fixing unit 170 has a hook shape.

Referring to FIG. 6, the bottom frame 150 includes a side surface 151 and a bottom surface 152. Although not shown, the bottom frame 150 includes four side surfaces combined with the bottom surface 152 to form a space. The reflective sheet 122 is disposed on the bottom surface 152 of the bottom frame, and the lamp 124 is disposed on or over the reflective sheet 122. The side support 128 is disposed at the end of the lamp 124, and the optical sheet 126 is disposed on the side support 128 and over the lamp 124. The first surface 128a of the side support 128 faces the lamp 124, and the second surface 128b of the side support 128 faces the side surface 151 of the bottom frame 150. The fourth surface 128d of the side support 128 faces the optical sheet 126, and the fifth surface 128e of the side support 128 faces the bottom surface 152 of the bottom frame 150. The second fixing unit 170 is disposed at the second surface 128b of the side support 128. The second fixing unit 170 vertically protrudes from the second surface 128b of the side support 128. The side surface 151 of the bottom frame includes a hole 151a corresponding to the second fixing unit 170. By the second fixing unit 170 is inserted into the hole 151a, the side support 128 is combined with the bottom frame 150. Since the second fixing unit 170 has a hook shape, the side support 128 is compactly combined with the bottom frame 150. The first portion 171 of the second fixing unit 170 has substantially the same cross-sectional area as the hole 151a, and the second portion 173 of the second fixing unit 170 has a taper shape. A distance from the second surface 128b of the side support 128 to an end of the second portion 173 of the hook shape is substantially same as a width of the side surface 151 of the bottom frame 150. When the first and second portions 171 and 173 of the second fixing unit 170 are inserted into the hole 151a, the second portion 173 of the second fixing unit 170 hooks at an outside of the side surface 151 of the bottom frame 150.

Referring to FIGS. 7A and 7B, the first fixing unit 160 includes a first portion 161 protruding from the fourth surface 128d of the side support 128 along the Y direction and a second portion 163 protruding from the first portion 161 along the Z direction. The first portion 161 of the first fixing unit 160 protrudes by a length L (of FIG. 5), and the second portion 163 of the first fixing unit 160 protrudes by a height H (of FIG. 5). In other words, the first and second portions 161 and 163 of the first fixing unit 160 extend from the second surface 128b (of FIG. 4) along the Y direction and the Z direction, respectively. A groove 151b is formed at a corner of the side surface 151 of the bottom frame 150. Namely, the groove 151b is positioned at a crossing portion of two adjacent side surfaces 151 of the bottom frame 150. The groove 151b corresponds to the first fixing unit 160 of the side support 128. The first portion 161 of the fixing unit 160 is inserted into the groove 151b to combine the side support 128 with the bottom frame 150.

Figure 8:
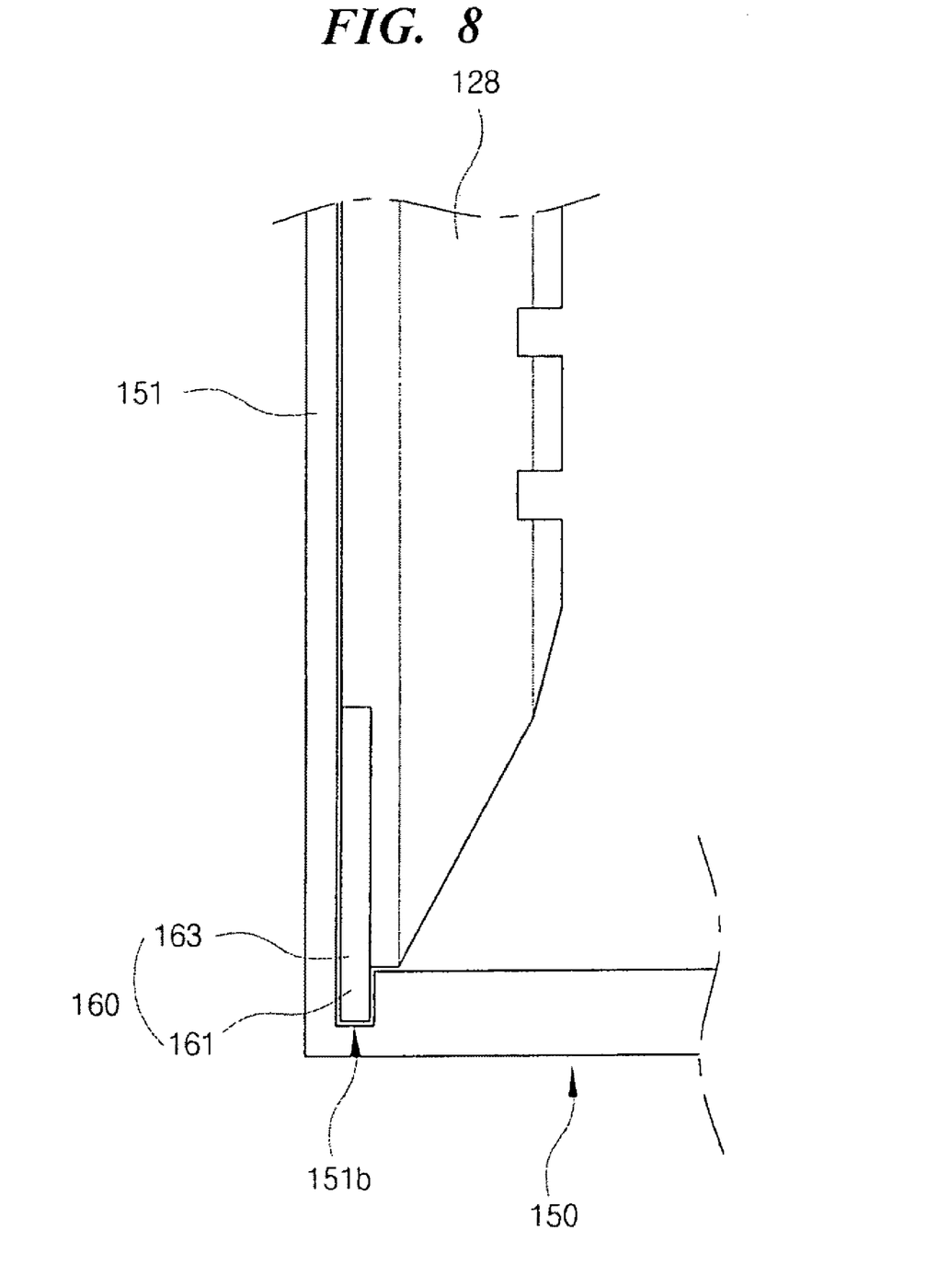
FIG. 8 is a plan view showing a side support combined with a bottom frame according to the present invention.

Referring to FIG. 8, the first portion 161 of the first fixing unit 160 has substantially the same width as the groove 151b. The first portion 161 of the first fixing unit 160 has a length L (of FIG. 5) being equal to or smaller than a width of the side surface 151 of the bottom frame 150. Accordingly, the first portion 161 of the first fixing unit 160 is compactly or tightly inserted into the groove 151b. The second portion 163 having a height H (of FIG. 5) protrudes from the fourth surface 128d of the side support 128, so the second portion 163 of the first fixing unit 160 protrudes from the side surface 151 of the bottom frame 150 when the side support 128 is combined with the bottom frame 150. The second portion 163 of the first fixing unit 160 is used for combining the side support 128 with the main frame 130 (of FIG. 3).

In brief, the side support 128 includes the first fixing unit 160 and the second fixing unit 170. The first fixing unit 160 protrudes from the side support 128 along a first direction, and the second fixing unit 170 protrudes from the side support 128 along a second direction being substantially perpendicular to the first direction. The bottom frame 150 includes the groove 151b and the hole 151a. The groove is positioned at a corner of the side wall 151 of the bottom frame 150, and the hole 151a is positioned at the side wall 151 of the bottom frame. By inserting the first and second fixing unit 160 and 170 into the groove 151b and the hole 151a, respectively, the side support 128 is compactly or tightly combined with the bottom frame 150.

In the backlight unit and the liquid crystal display module (LCDM) of the present invention, the side support 128 is combined with the bottom frame 150 using not only the second fixing unit 170 but also the first fixing unit 160. Due to the first fixing unit 160 instead of the screw in the related art backlight unit, production coasts and production time are reduced. Moreover, there is no problem resulted from particles when the screw is inserted into screw holes in the related art backlight unit. There is no damage on the side support by stress from a process of inserting the screw into the first and second screw holes. Furthermore, the first and second fixing units 160 and 170 are integrated with the side support 128 by a single molding process, and the same material, a fabricating process is simplified.

It will be apparent to those skilled in the art that various modifications and variations can be made in the exemplary embodiments of the backlight unit and the LCDM without departing from the spirit or scope of the invention. Thus, it is intended that the invention cover the modifications and variations of this invention provided they come within the scope of the appended claims and their equivalents.

What is claimed is:

1. A backlight unit for a display device, comprising:
a frame having a bottom surface, a side wall and a groove, the groove disposed at a corner of the side wall;
a lamp over the bottom surface and disposed along a first direction;
a side support corresponding to at least one end of the lamp and disposed along a second direction being substantially perpendicular to the first direction; and
a first fixing unit disposed at an end of the side support and including a first portion, the first portion extending from the side support along the second direction and corresponding to the groove.

2. The backlight unit of claim 1, wherein the first portion has substantially the same length and width as the groove.

3. The backlight unit of claim 2, wherein each of the first portion and the groove has a length being equal to or smaller than the side wall.

4. The backlight unit of claim 1, wherein the first fixing unit further includes a second portion extending from the side wall to be perpendicular to the bottom surface.

5. The backlight unit of claim 1, further comprising a second fixing unit extending from the side support along the first direction and having a hook shape, wherein the second fixing unit corresponds to a hole at the side wall of the frame.

6. The backlight unit of claim 1, wherein the side support includes an opening corresponding to the lamp, and an end of the lamp is inserted into the opening.

7. The backlight unit of claim 1, wherein the side support includes first, second, third and fourth surfaces forming a trapezoid shape in a cross-sectional view, and wherein the first surface is substantially perpendicular to the third and fourth surfaces, and the second surface is oblique to the third and fourth surface.

8. The backlight unit of claim 7, wherein the third surface as an upper side of the trapezoid shape has a smaller width than the fourth surface as a lower side of the trapezoid shape.

9. The backlight unit of claim 1, further comprising a reflective layer between the bottom surface and the lamp.

10. The backlight unit of claim 1, further comprising an optical sheet over the lamp.

11. A liquid crystal display module, comprising:
a liquid crystal panel;
a backlight unit for projecting light on the liquid crystal panel, the backlight unit including:
a first frame having a bottom surface, a side wall and a groove, the groove disposed at a corner of the side wall;
a lamp over the bottom surface and disposed along a first direction;
a side support corresponding to at least one end of the lamp and disposed along a second direction being substantially perpendicular to the first direction; and
a first fixing unit disposed at an end of the side support and including a first portion, the first portion extending from the side support along the second direction and corresponding to the groove.

12. The liquid crystal display module according to claim 11, wherein the first portion has substantially the same length and width as the groove.

13. The liquid crystal display module according to claim 12, wherein each of the first portion and the groove has a length being equal to or smaller than the side wall.

14. The liquid crystal display module according to claim 11, wherein the first fixing unit further includes a second portion extending from the side wall to be perpendicular to the bottom surface.

15. The liquid crystal display module according to claim 11, further comprising a second fixing unit extending from the side support along the first direction and having a hook shape, wherein the second fixing unit corresponds to a hole at the side wall of the frame.

16. The liquid crystal display module according to claim 11, wherein the side support includes an opening corresponding to the lamp, and an end of the lamp is inserted into the opening.

17. The liquid crystal display module according to claim 11, wherein the side support includes first, second, third and fourth surfaces forming a trapezoid shape in a cross-sectional view, and wherein the first surface is substantially perpendicular to the third and fourth surfaces, and the second surface is oblique to the third and fourth surface.

18. The liquid crystal display module according to claim 17, wherein the third surface as an upper side of the trapezoid shape has a smaller width than the fourth surface as a lower side of the trapezoid shape.

19. The liquid crystal display module according to 11, further comprising a reflective layer and an optical sheet, the reflective sheet being disposed between the bottom surface and the lamp and the optical sheet being disposed over the lamp.

20. The liquid crystal display module of claim 11, further comprising a second frame surrounding the optical sheet and attached to the first frame and a third frame surrounding an edge of the liquid crystal panel and attached to the first and second frames.

* * * * *